United States Patent [19]

Romberg

[11] Patent Number: 4,869,744

[45] Date of Patent: Sep. 26, 1989

[54] METHOD OF MANUFACTURING AN ELECTRIC LAMP, AND DEVICE FOR PERFORMING SUCH A METHOD

[75] Inventor: Hendrik Romberg, Eindhoven, Netherlands

[73] Assignee: U.S. Philips Corporation, New York, N.Y.

[21] Appl. No.: 204,142

[22] Filed: Jun. 8, 1988

[30] Foreign Application Priority Data

Jun. 15, 1987 [NL] Netherlands .......................... 8701385

[51] Int. Cl.⁴ .............................................. C03B 33/08
[52] U.S. Cl. ......................................... 65/105; 65/109; 65/279
[58] Field of Search ....................... 445/22, 26; 65/105, 65/109, 114, 269, 279, 280; 313/623, 624, 634

[56] References Cited

U.S. PATENT DOCUMENTS 2,764,847 10/1956 Buell ........................................ 65/113
3,207,590 9/1965 Corbeek .................................. 65/280
3,880,637 4/1975 Dichter .................................... 65/113
3,897,233 7/1975 Szilagyi ................................... 65/109
4,629,437 12/1986 Roche ..................................... 445/26

FOREIGN PATENT DOCUMENTS 85234 2/1896 German Democratic Rep. ... 65/269

Primary Examiner—Kenneth J. Ramsey
Attorney, Agent, or Firm—Brian J. Wieghaus

[57] ABSTRACT

Method of manufacturing an electric lamp having a glass tubular part (101) with a longitudinal axis, which part is sealed by a sealing member in which firstly a constriction with a collar (105) is formed by means of heating at one end of the tubular part whereafter the sealing member is secured in a gas-tight manner. The constriction in the tubular part is provided at some distance from the end whereafter in the same fixture the tubular part is divided by means of fusing at the area of the constriction and the two wall portions located on either side of the constriction are moved apart in the axial direction.

17 Claims, 4 Drawing Sheets

METHOD OF MANUFACTURING AN ELECTRIC LAMP, AND DEVICE FOR PERFORMING SUCH A METHOD

BACKGROUND OF THE INVENTION

The invention relates to a method of manufacturing an electric lamp having a glass tubular part with a longitudinal axis, which part is sealed by a sealing member. A constriction with a collar is formed by means of heating at one end of the tubular part in which subsequently the sealing member is secured in a gas-tight manner. The invention also relates to an electric lamp obtained by means of such a method and to a device for performing such a method.

Such a method is generally known, particularly in the manufacture of tubular low-pressure mercury vapour discharge lamps. For securing a sealing member such as a "stem", a constriction is provided in the end of a discharge tube by heating the end of the glass wall at its end until the glass softens and by subsequently giving the glass wall of the end the desired shape by means of a profiling tool so that a collar is obtained. The discharge tube is sealed in a gas-tight manner and is subsequently exhausted by means of the exhaust tube present in the stem as described, for example, in British Patent Specification No. 1,475,458. A stem is herein understood to mean a glass portion comprising an exhaust tube and electrode pins between which an electrode is arranged.

In the known method, a tube is cut to the desired length in a first fixture whereafter the constriction with the collar is formed in a second fixture. The use of two differnt fixtures easily leads to inaccuracies in the shape and dimensions of the end of the tubular part. This is notably unwanted in a bulk manufacturing process because then a reliable sealing by means of the sealing member is obtained to an insufficient extent.

SUMMARY OF THE INVENTION

The object of the invention is to provide a method of manufacturing an electric lamp having a glass tubular part which is sealed by a sealing member in which a reliable sealing of the tubular part is obtained in a bulk-manufacturing process.

According to the invention the method described in the opening paragraph is therefore characterized in that the constriction in the tubular part is provided at some distance from the end thereafter in the same fixture the tubular part is divided by means of fusing at the area of the constriction and the two wall portions located on either side of the constriction are moved apart in the axial direction.

By using only one fixture the specific requirements imposed on the shape and dimensions of the end of the tubular part accommodating the sealing member are compiled with an end sufficient extent. A tubular part is obtained with an end whose constriction with the collar is constructed in a reproducible way. A high production rate is obtained by fusing instead of cutting in the same fixture, while the dimensions of the constriction and the collar can be determined independently of the tube diameter.

An advantageous embodiment of the method in which the tubular part rotates during provision of the constriction and during fusing is characterized in that the rotational speed of the tubular part during fusing is faster than the rotational speed during provision of the constriction.

The constriction is preferably provided by firstly softening the glass wall of the tubular part and by subsequently pressing the glass wall inwards by means of a profiling tool that may comprise profiling rollers while the tubular part is rotating. The shape of the constriction is maintained due to a relatively low rotational speed of the tubular part. In fact, the centrifugal force occurring during rotation and being exerted on the glass softened at the area of the constriction should not be too large. During fusing the rotational speed of the tubular part is faster so as to obtain a homogeneous temperature around the tubular part. The molten glass is also pressed outwards (due to the then occurring larger centrifugal force), so that a raised edge is obtained on the outer side of the glass wall. This is important for the further production process of the lamp, notably when providing a suspension of luminescent material during the manufacture of a tubular low-pressure mercury vapour discharge lamp.

A practical embodiment of the method is characterized in that the rotational speed of the tubular part during fusing is approximately twice the rotational speed during provision of the constriction. When using this embodiment the said edge at the end of the tubular part has optimum dimensions. The sealing member is then incorporated without any problems.

Another embodiment of the method is characterized in that a narrow zone of the glass wall is heated when dividing the tubular part at the area of the constriction and in that simultaneously the portions of the glass wall located on either side of said zone are cooled.

By heating a narrow zone whilst dividing the tubular part in which the directly adjoining glass wall is cooled and the wall portions located on either side of the constriction are moved apart in the axial direction, only the glass wall at the area of the heated narrow zone will become increasingly thinner, while the ends of the glass wall have a smooth surface after fusing. Unwanted unevennesses are then avoided. In a practical embodiment the zone has a width of at most 5 mm.

The invention is preferably used in the manufacture of tubular low-pressure mercury vapor discharge lamps.

The invention also relates to a device for performing the method according to the invention, which device is characterized in that it comprises two sets of burners and clamps for clamping the tubular part on either side of the location where the constriction is provided, said clamps being rotatable with respect to the burners and being movable with respect to each other in a direction which corresponds to the longitudinal axis of the said tubular part, one set of burners being present for the purpose of providing the constriction and the other set being present for the purpose of fusing.

The device comprises burners for heating the tubular part for the purpose of softening the glass wall so that the constriction can be provided and for the purpose of dividing the tubular part by means of fusing. By clamping the tubular part on either side of the location where the constriction is provided, the tubular part bends less when a jig is pressed against the glass wall softened at the area of the constriction than when the tubular part is clamped on one side only. Since the tubular part bends to a lesser extent, a constriction of good quality is formed.

A preferred embodiment of the device for performing the method according to the invention is characterized in that the burners for fusing are formed as pencil burners while furthermore slit-shaped openings are present on either side of each pencil burner, which openings serve to supply a gas stream for cooling the wall portions adjacent the part of the glass wall to be heated.

By using a burner having a pointed end in which three slit-shaped openings are present it is possible to heat a narrow zone and to simultaneously cool the wall portions directly adjoining said zone. The central opening is to supply a combustible gas mixture for heating the glass wall. The outer openings are to supply a gas stream ensuring that the glass wall directly adjoining the zone to be heated is cooled.

BRIEF DESCRIPTION OF THE DRAWINGS

The invention will now be described in greater detail, by way of example, with reference to the accompanying drawings in which.

DESCRIPTION OF THE PREFERRED EMBODIMENT

Figure 1:
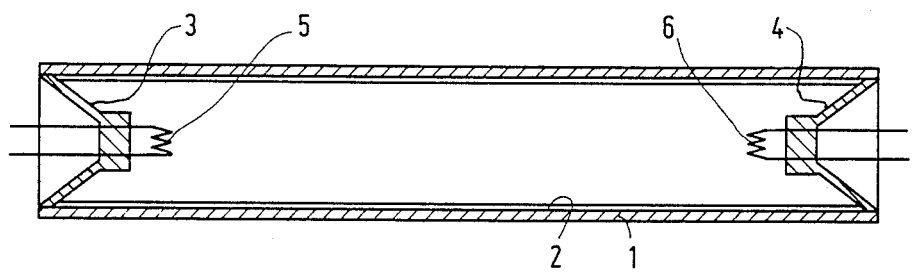
FIG. 1 shows diagrammatically a tubular lowpressure mercury vapour discharge lamp obtained by means of the method according to the invention.

FIG. 1 is a diagrammatic cross-section of a lowpressure mercury vapor discharge lamp having a tubular glass discharge vessel 1 whose inner side is coated with a luminescent layer 2. Stems 3 and 4 are secured in a gas-tight manner to the ends of the tubular glass discharge vessel, which ends are obtained by means of the method according to the invention. The stems have electrodes 5 and 6 between which the discharge is maintained during operation. The lamp contains a small quantity of mercury and a rare gas as a starter gas.

Figure 2:
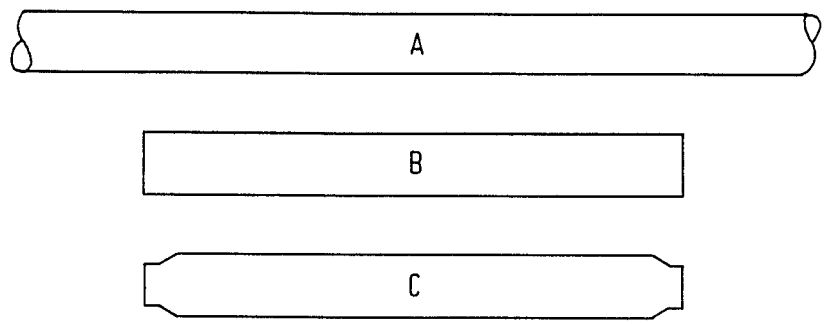
FIG. 2 shows diagrammatically the different steps in the production of a tubular low-pressure mercry vapor discharge lamp in accordance with the known method.
Figure 3:
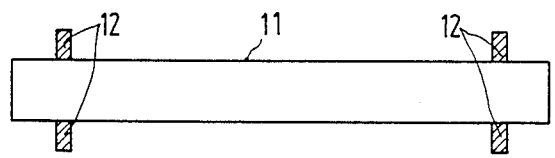
FIG. 3 shows how the tubular part is clamped by using the known method.

In FIG. 2 the reference A denotes a long glass tube whose ends are cut off during the first production step of the known method. A tube B of the desired length is then obtained. During the second production step this tube B is subsequently provided with constricted ends with a collar so that a tube of the shape according to C is obtained. During this process the ends of the tube are clamped. This is shown in FIG. 3. In this FIGURE the reference numeral 11 denotes the tube. The clamps are denoted by 12. After the ends have been provided with the constriction and the collar, a luminescent layer is provided in known manner on the inner wall of the tube and the sealing members are secured in a gas-tight manner.

Figure 4:
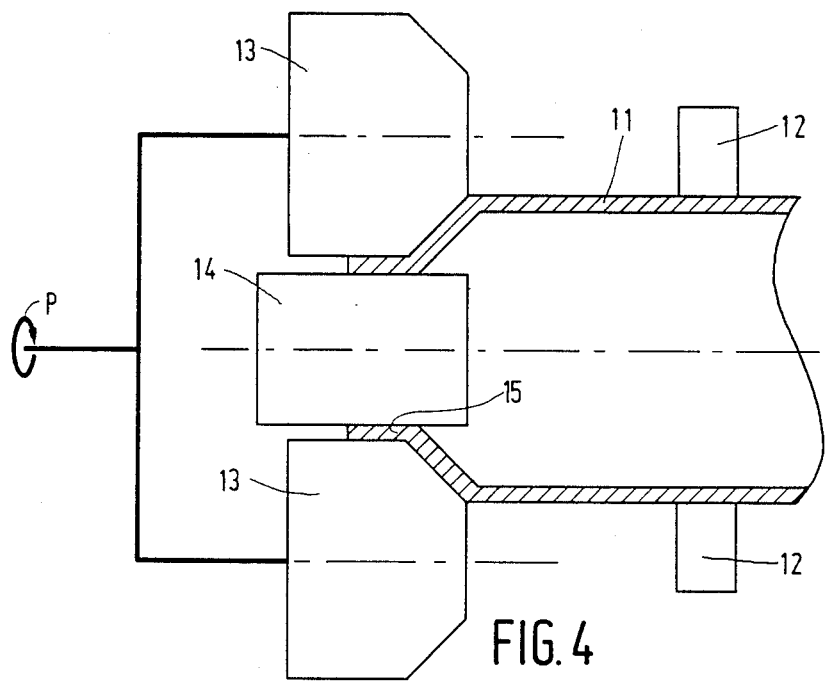
FIG. 4 shows how the constriction with the collar is provided at the end of the tube by means of the known method.

The production process step in accordance with the known method of providing the constriction with the collar will be described in greater detail with reference to FIG. 4. In this FIG. 4, the reference numeral 11 denotes the glass tube which is clamped in the clamps 12. The end of the tube 11 is softened by heating the end. Subsequently the end is brought to the desired shape by means of profiling rollers 13 and a mandrel 14. The rollers 13 ensure that the tube is constricted and a collar 15 is obtained because the rollers 13 move in the direction of the mandrel 14. The mandril 14 ensures that the tube wall is not pressed too far inwards. The arrow P denotes the direction of rotation of the rollers.

Figure 5:
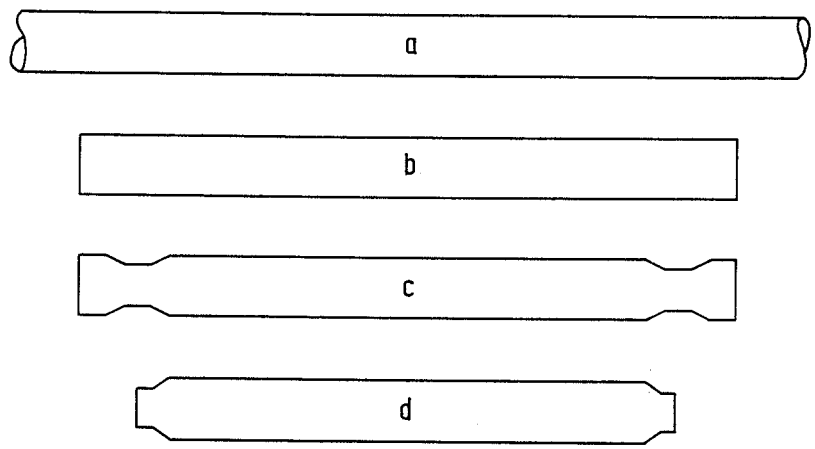
FIG. 5 shows diagrammatically the different steps in the production of a tubular low-pressure mercry vapor discharge lamp by means of the method according to the invention.
Figure 6:
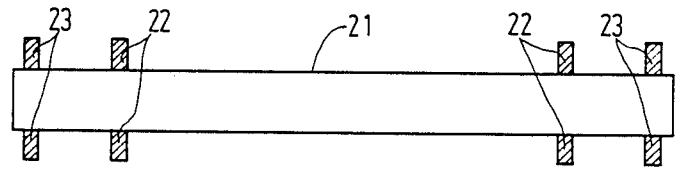
FIG. 6 shows how the tubular part is clamped by means of the method according to the invention.

In FIG. 5 the reference a denotes a tube which is similar to A in FIG. 2. During the steps shown in the method according to the invention a tube b is formed during the first production step by means of cutting with a glass cutter. This tube b is longer than the tube B of FIG. 2. During the second production step the constrictions are provided at some distance from the respective ends (tube c). The tube is then divided at the area of the constriction and the loose ends then obtained are removed so that tube d is obtained. This is affected in the same fixture. The shape and length of tube d correspond to those of tube C of FIG. 2. In order to ensure that the tube is not warped when the constriction is provided by means of a profiling tool, the tube is firstly clamped on either side of the location where the constriction is to be provided. This is shown in FIG. 6. In this FIG. 6 the tube 21 (which has the shape of tube b) is clamped in the clamp-pairs 22 and 23 on either side of the locations where the constrictions are to be provided.

Figure 7:
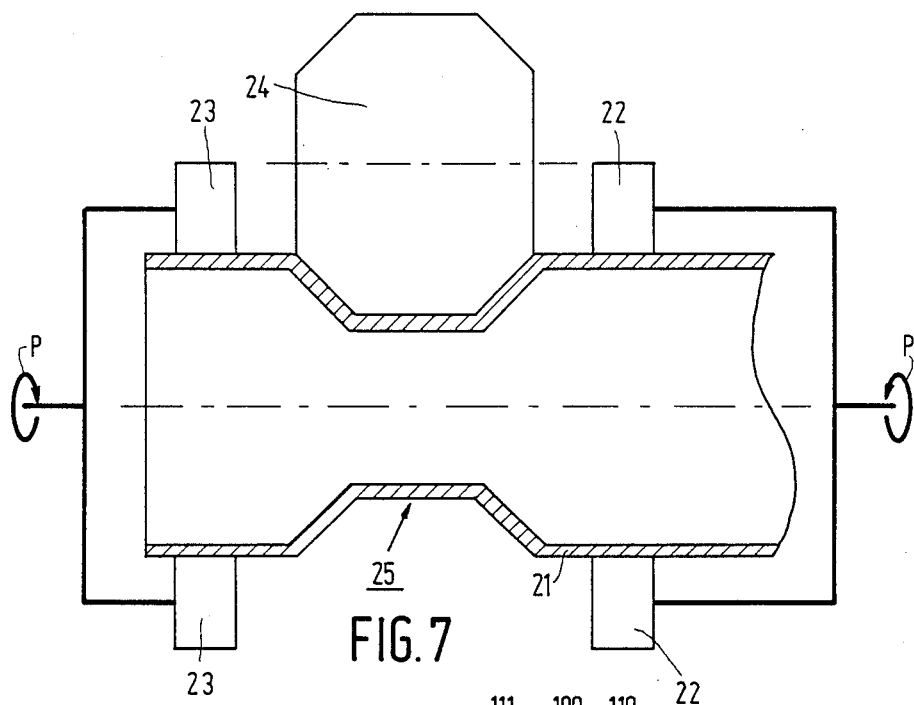
FIG. 7 shows how the constriction is provided in the tube by means of the method according to the invention.

FIG. 7 shows in detail how the constriction is provided by means of a profiling tool, that comprises a profiling roller 24. The tube 21 is clamped in the clamps 22 and 23. The arrows P indicate in which direction the tube with the clamps rotates. The tube wall is softened at the area where the constriction is to be provided. The constriction 25 is formed by pressing profiling tool 24 on the softened glass wall.

Figure 9:
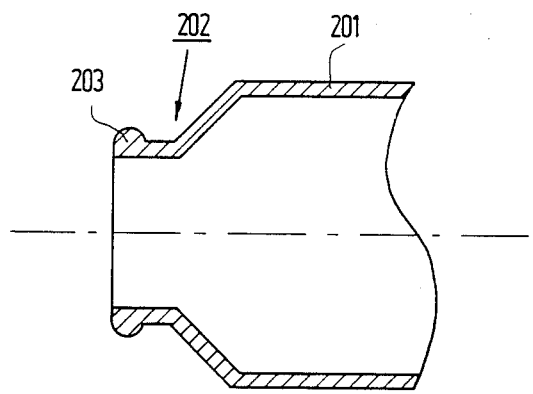
FIG. 8 shows how the tubular part is divided by means of the method acording to the invention and FIG. 9 shows how the end is formed by means of the method according to the invention.
Figure 8:
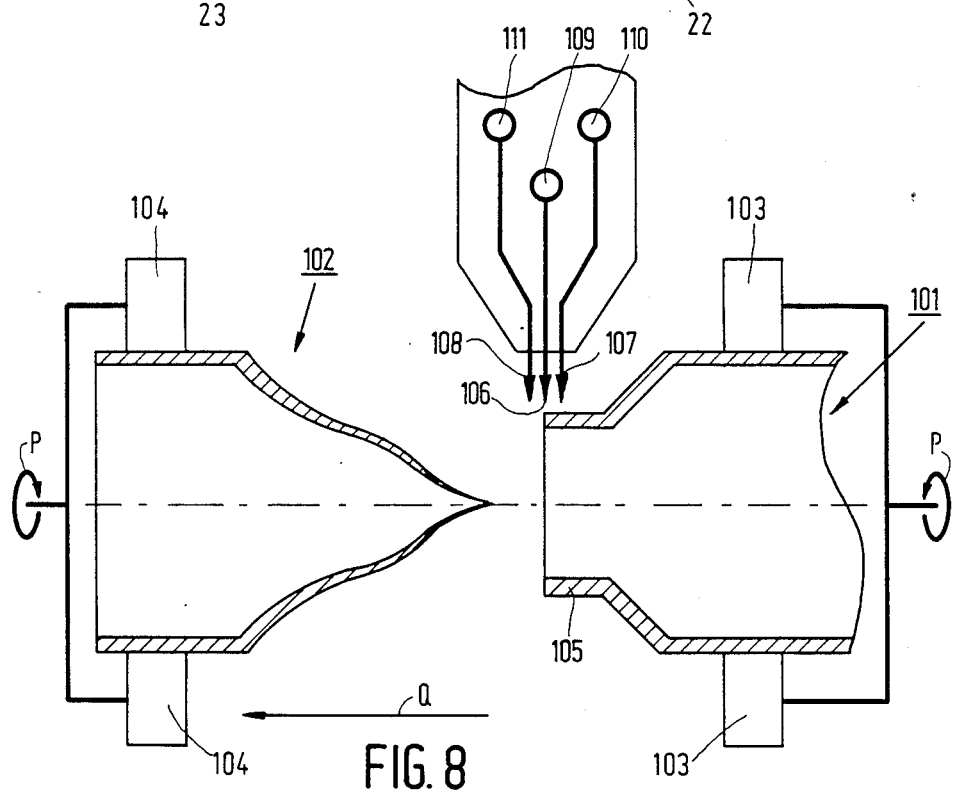

FIG. 8 shows in greater detail how the tube is subsequently divided into tube part 101 and part 102. The clamps 103 and 104 correspond to the clamps 22 and 23 of FIG. 7. Here again the arrows P indicate the direction of rotation of the tube with the clamps. By dividing the tube at the area of the constriction and by removing part 102, tube 101 is obtained which is provided with a constriction with a collar 105. The tube is divided by means of fusing. The burner which is used for this purpose has three openings 106, 107 and 108. The opening 106 is provided via supply duct 109 with a combustable gas mixture for heating the glass wall. The openings 107 and 108 are provided via the supply ducts 110 and 111 with a cooling gas stream. This cooling gas stream is used to cool the glass wall directly adjoining the zone to be heated. During fusing the part 102 must be pulled away from the tube. This is indicated by the arrowo Q to he left. Since the tube is rotated during fusing, the molten glass will be pressed slightly outwards. This is shown in FIG. 9. An outwardly raised edge 203 is present at the end on the tube 201, which is provided with constriction with a collar 202. When providing the suspension of luminescent material (which is often effected when the tube assumes a vertical position) liquid is prevented from coagulating against an inwardly raised edge. This is also a drawback when providing the sealing member, the so-called stem, at a later stage.

In a practical embodiment of a tubular low-pressure mercury vapor discharge lamp the length between the constriction at the two ends is 1200 mm. The thickness of the glass wall at the constriction is approximately 2 mm. The internal diameter at the area of the collar is 23 mm. Elsewhere in the lamp the internal diameter is 26 mm. The height of the collar is approximately 6 mm.

What is claimed is:

1. A method of manufacturing an elongate tubular lamp vessel having a collar at each end, said method comprising:
   (a) providing a glass tube with a predetermined length;
   (b) near each end of said glass tube, circumferentially clamping said tube at two adjacent clamping positions;
   (c) heating the portions of said glass tube between each of said adjacent clamping positions to the working temperature of the glass;
   (d) forming a constriction in said heated portions of said glass tube between each of said adjacent clamping positions;
   (e) separating the end portions of the tube between the tube ends and said constriction by heating the glass tube at each constriction in a narrow circumferential region and axially pulling the end portions from the remainder of the tube, leaving a length of tube with a collar at each end.

2. A method as claimed in claim 1, wherein said tube is held in a same fixture during forming of said constrictions and removal of said end portions, said fixture comprising two pairs of spaced clamping means for holding said tube at said clamping positions, said clamping means being rotatable for allowing rotation of said tube, and the outer clamping means of each pair being axially movable away from the inner clamping means of each pair for allowing removal of said end portions.

3. A method as recited in claim 2, wherein said constrictions are formed in said tube by rotating said tube and pressing a profiling tool against said heat softened portions, the speed of rotation being slow enough such that centrifugal forces do not distort the resulting constriction.

4. A method as recited in claim 3, wherein during said step of removing said end portions said tube is simultaneously cooled at areas immediately adjacent said heated narrow circumferential region.

5. A method as claimed in claim 4, wherein during the step of removing said end portions said tube is rotated at a rate such that a circumferential outwardly raised edge is formed on the end of each said collar and the internal surface of each collar end is substantially flat and free of any internal protrusions.

6. A method as recited in claim 2, wherein during said step of removing said end portions said tube is simultaneously cooled at areas immediately adjacent said heated narrow circumferential region.

7. A method as claimed in claim 2, wherein during the step of removing said end portions said tube is rotated at a rate such that a circumferentially outwardly raised edge is formed in the end of each said collar and the internal surface of each collar end is substantially flat and free of any internal protrusions.

8. A method as recited in claim 1, wherein during said step of removing said end portions said tube is simultaneously cooled at areas immediately adjacentn said heated narrow circumferential region.

9. A method as claimed in claim 1, wherein during the step of removing said end portions said tube is rotated at a rate such that a circumferentially outwardly raised edge is formed in the end of each said collar and the internal surface of each collar end is substantially flat and free of any internal protrusions.

10. An apparatus for manufacturing a glass tube having a collar at each end, said apparatus comprising:
    two spaced pairs of clamping means for holding a length of glass tube, the clamping means of each pair being locatable for clamping a said tube at two adjacent positions near a respective end of said length of glass tube, said clamping means being rotatable for allowing rotation of a glass tube held in said clamping means;
    a first burner locatable for heating said tube to the working temperature of the glass in the regions between the clamping means of each pair of clamping means;
    profiling means comprising profiling rollers axially locatable and laterally moveable against said glass tube in the regions between the clamping means of each pair for forming a constriction in said tube in said regions;
    a second burner locatable for severing said glass tube at the area of each constriction, each burner comprising a first opening for forming a pencil-tipped flame for heating said tube in a narrow axial region, and a pair of openings bounding said first opening for supplying a stream of cooling gas for cooling said tube in the axial regions immediately adjacent said narrow axial heated region;
    means for rotating said clamping means for rotating said tube at predetermined rotational speeds; and
    means for axially moving the outer clamping means of each pair away from the respective inner clamping means of each pair while said clamping means hold respective portions of a glass tube secured therein.

11. An apparatus as claimed in claim 10, wherein said second burner forms a pencil-tipped flame for heating said narrow region over an axial length of less than 5 mm.

12. An apparatus as claimed in claim 11 wherein said apparatus comprises two of said first burner.

13. An apparatus as claimed in claim 12 wherein said apparatus comprises two of said second burner.

14. An apparatus as claimed in claim 10 wherein said apparatus comprises two of said second burner.

15. A glass tube having a collar at each end manufactured according to the method of claim 1.

16. A glass tube having a collar at each end manufactured according to the method of claim 2.

17. A glass tube having a collar at each end manufactured according to the method of claim 5.

* * * * *